United States Patent [19]
Hoy

[11] Patent Number: 5,259,280
[45] Date of Patent: Nov. 9, 1993

[54] TOOL WITH TORQUE-TRANSMITTING WORKING SURFACES AND METHOD FOR THE MANUFACTURE THEREOF

[75] Inventor: Robert Hoy, Velbert, Fed. Rep. of Germany

[73] Assignee: Wera Werk Hermann Werner GmbH & Co. KG, Wuppertal, Fed. Rep. of Germany

[21] Appl. No.: 886,377

[22] Filed: May 20, 1992

[30] Foreign Application Priority Data

Jul. 2, 1991 [DE] Fed. Rep. of Germany ....... 4121839

[51] Int. Cl.⁵ .............................................. B25B 15/00
[52] U.S. Cl. ...................................... 81/436; 81/900; 76/116; 76/DIG. 12
[58] Field of Search .......................... 81/186, 436, 900; 76/116, 119, DIG. 12

[56] References Cited

U.S. PATENT DOCUMENTS 5,036,733  8/1991  Tiholiz et al. ........................ 76/119

FOREIGN PATENT DOCUMENTS 3829033  3/1989  Fed. Rep. of Germany .

*Primary Examiner*—James G. Smith
*Attorney, Agent, or Firm*—Martin A. Farber

[57] ABSTRACT

A invention relates to tool having working surfaces (5) which transmit torque by application against a workpiece and are provided with particles of friction material (8) consisting of metallic or mineral material, such as quartz and/or diamond chips, attached by metallic embedment, and for optimal development of the working surface for the transmission of torque there is an electroplated metallic base layer (7) for solely surface application of the particles of friction material (8) of an embedment layer (9) for the particles of friction material which is then also electroplated, the thickness (x) of the base layer (7) being less than that of the embedment layer (9) and the thickness (y) of the latter being less than the particle size of the particles of friction material (8).

5 Claims, 2 Drawing Sheets

U.S. Patent    Nov. 9, 1993    Sheet 1 of 2    5,259,280
FIG. 2
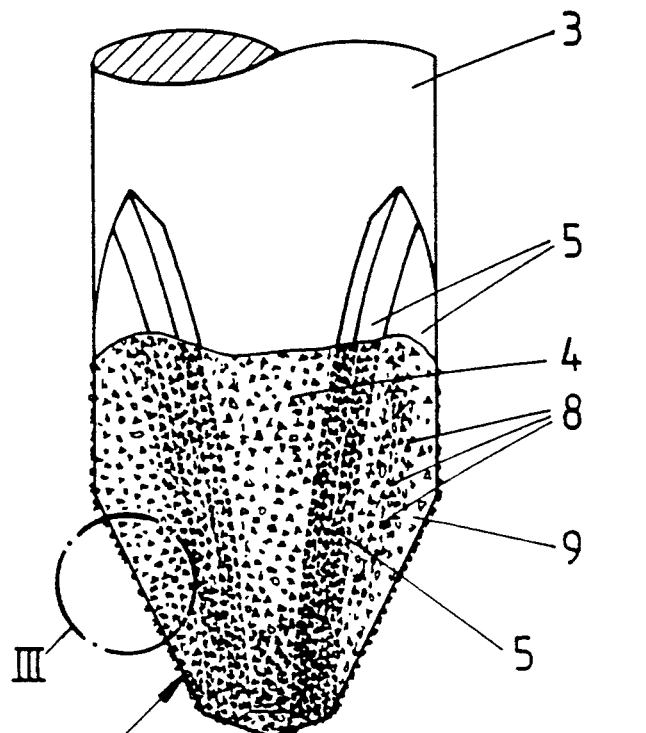
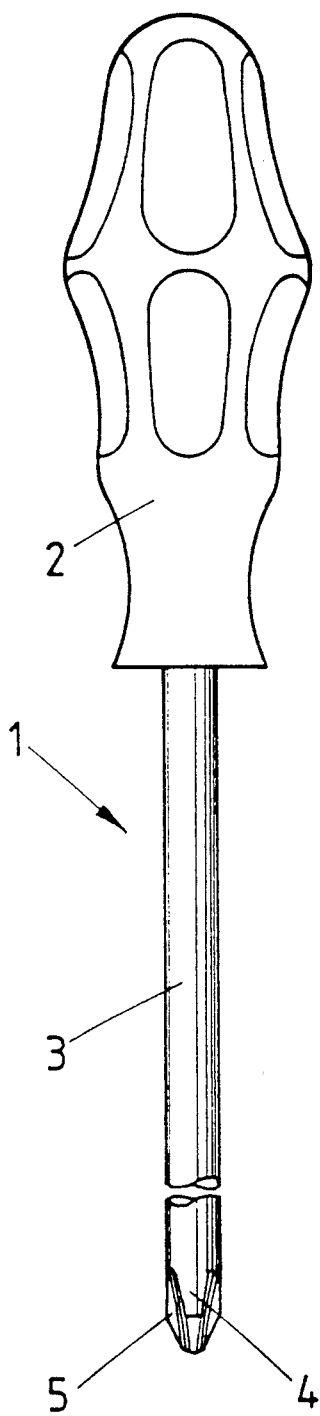
FIG. 1
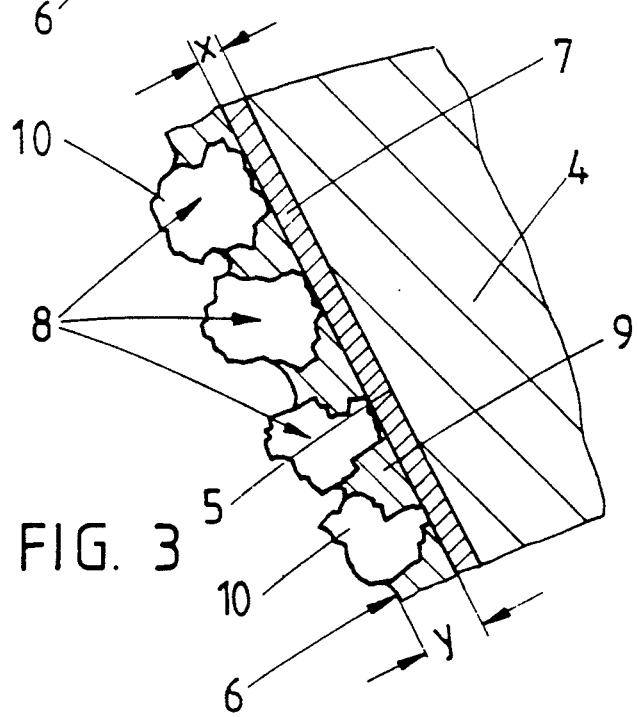
FIG. 3

TOOL WITH TORQUE-TRANSMITTING WORKING SURFACES AND METHOD FOR THE MANUFACTURE THEREOF

FIELD AND BACKGROUND OF THE INVENTION

The present invention relates to a tool with working surfaces which transmit torque by their application against a workpiece and are provided with particles of friction material consisting of metallic or mineral material.

Wrenches/screwdrivers, as well as screwdriver bits having working ends of different shape are known as tools for the transmitting of torque. Depending on their development, slotted screws, Phillips screws or hexagon socket screws can be driven. As a rule, only alloyed steels are used for the manufacture of the screwdriver blades in order to satisfy the prerequisite of sufficient transmission of torque. In order to obtain corrosion protection, the working ends can be blackened and preserved or else provided with a nickel-chrome coating in an electroplating bath. The permanence of such protective measures is frequently insufficient. Upon electroplating, there is even the danger of hydrogen embrittlement of the working end. Furthermore, the danger of the working end sliding out of the screw head or the like is considerable and is dependent on the surface structure.

SUMMARY OF THE INVENTION

The object of the present invention is to develop the working surfaces of the tool of the type in question for the transmission of torque in optimal fashion and to provide a method for the manufacture of such tool.

As a result of this invention, the working surfaces are first of all provided with a metallic covering consisting of a hard base layer, for instance nickel, of a thickness within the region of 15 $\mu$m. This nickel layer, which is applied by electroplating, leads, in view of the hardness of metal, to a certain amount of reduction of wear upon the transmission of the torque and to protection of the surface, particularly from corrosion. It is to be considered a surprising effect of such a dimensioning of the nickel layer of about 15 $\mu$m that no detrimental hydrogen embrittlement of the working surfaces occurs. Thus, a long, useful life is assured even upon hard use of the tool. In order, furthermore, to prevent the working end jumping or sliding out of the drive opening of the workpiece, the electroplated metallic base layer is provided for merely surface application of the particles of friction material and the adjoining, also electroplated embedment layer for the particles of friction material. In this connection, such a dimensioning is selected that the thickness of the base layer is less than that of the embedment layer and its thickness is less than the particle size of the particles of friction material. Instead of a linear resting of the working surfaces in the case of a screwdriver, one in this way obtains surface application continuously with increasing torque, the regions of the particles of friction material which protrude beyond the embedment layer entering into a digging form-lock with the drive surfaces of the workpiece. When the latter is developed as a screw, this means that the working surfaces dig themselves to a certain extent into the wall of the slot of the screw head to a limited depth, limited, for instance, by the harder layer (nickel) of the entire working end. The surface load acting on the working surfaces is optimal so that, with respect to the size of the screw, optimal torques can be transmitted. The fact that the particles of friction material can in this connection rest on the equally hard metal base layer (nickel) so that the introduction of the force takes place directly into the working surfaces is also favorable for the transmission of force. It is surprising that, upon the application of the particles of friction material with the embedment layer, a mono-particulate layer of the particles of friction material statistically is produced over partial regions aside from the fillet regions. In the force-transmitting region of the working surfaces, this corresponds to a single layer of the particles of friction material. The reduction in stability which the working end necessarily experiences due to the necessary smaller size (about 3/100 mm) is compensated for by the corresponding coating so that there is no disadvantage with respect to a reduction in stability. It has been found advantageous to use nickel or an alloy of the 1st to 8th groups for the base layer and for the embedment layer. It is then possible to produce the base layer in a thickness of about 1–100 $\mu$m and to select a size of particle of between 3 and 500 $\mu$m. With a relatively small particle size, the coating with the particles of friction material appears to the human eye as a shadowed region of the working surface. It has been found that a variation in the application of the particles in the electroplating bath is present on the differently directed and possibly structured surfaces of the working end. Thus, a greater accumulation of particles is obtained on the approximately radially inwardly directed working surfaces in the fillets than on the other regions. Furthermore, on the circumferential side of the ribs, due to a machining of the driven tip, there results an approximately corrugated course, together with the fact that the greater accumulation of the particles occurs in the valleys. All of this contributes to the working end coming into a stable seat with respect to the crosswise slot of the screw, which opposes the sliding out of the working end. The embedment layer has a thickness, however, which is always less than the particle size of the particles of friction material. The particle size is dependent in this connection on the specific purpose of use; the greater the particle size, the more the "cam-out effect" decreases. Furthermore, it should also be emphasized that, upon the application of the layers including the particles of friction material, the working end is not subject to injurious heating so that the strength of the working end remains assured. Such a heating occurs upon the known application of particles of friction material by brazing (for example, Federal Republic of Germany OS 38 29 033). An alternative solution consists in pressing the particles of friction material into the working surfaces. In that case, they become anchored in the material in the region of the working surfaces. The load exerted on the particles of friction material upon the transmission of force also acts in the direction of anchoring and therefore opposes detachment of the particles of friction material. The tool is manufactured in the manner that, first of all, the metallic base layer is electroplated to the working surface. The application of the particles of friction material consisting of metallic or mineral materials which come into surface application with the base layer is then effected by electrolytic embedment in the embedment layer, which fills the spaces between the particles of friction material located individually alongside of each other up to a part of their height. By the region then protruding above the embedment layer, the particles of friction material, upon the transmission of force, grip into the corresponding drive surfaces of the material and assure a particularly good driving of the workpiece and prevent the working end from jumping out of the workpiece. As an alternative, it would also be possible to press the crystalline particles into the embedment layer after their electrolytic application.

BRIEF DESCRIPTION OF THE DRAWINGS

One embodiment of the invention will be explained below with reference to FIGS. 1 to 5, in which:

FIG. 1 is a view of a tool developed as screwdriver for Phillips head screws, shown in approximately actual size;

FIG. 2 is an enlarged view of the working end of the screwdriver blade;

FIG. 3 is a greatly enlarged showing of the portion indicated by the line III—III in FIG. 2;

DETAILED DESCRIPTION OF THE PREFERRED EMBODIMENT

Figure 4:
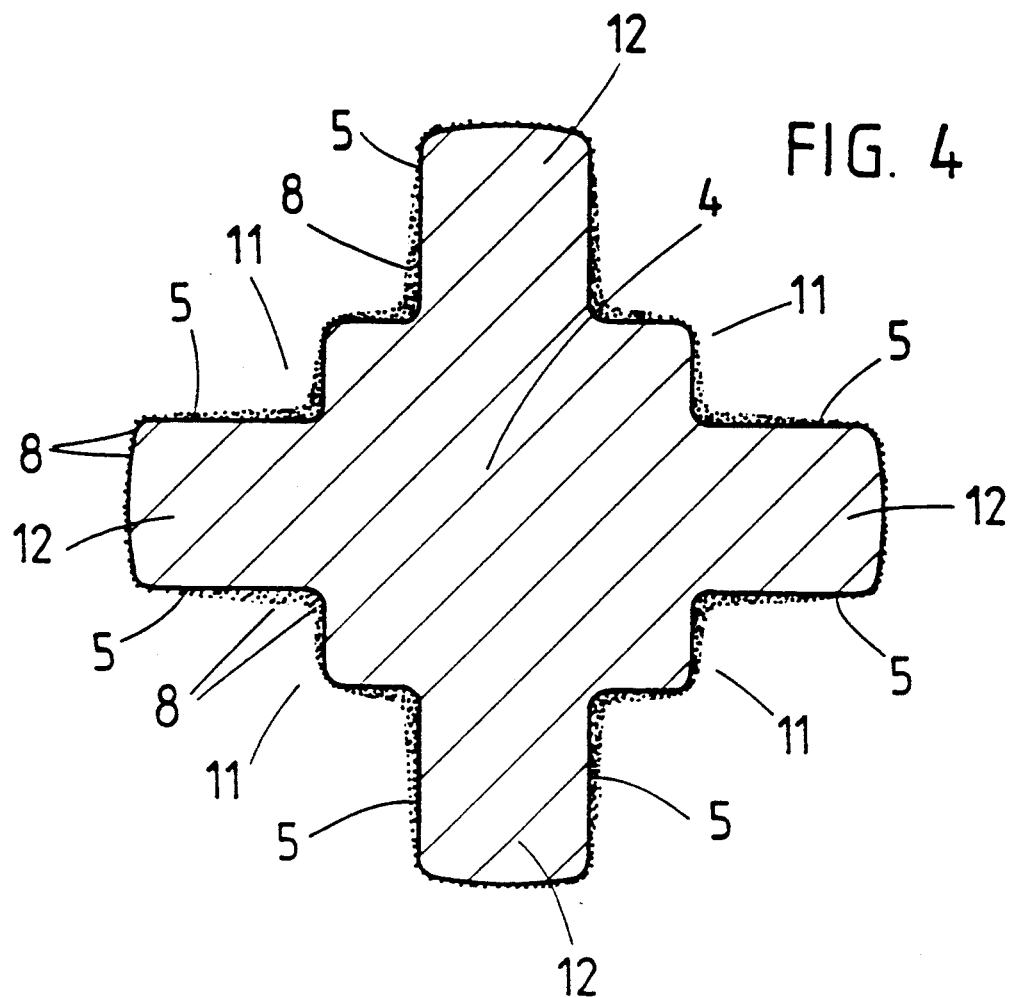
FIG. 4 shows also enlarged a cross section through the working end.

The tool, which is developed in the form of a screwdriver 1, has a handle 2 with blade 3 inserted in it. As the working end 4 of the blade shows, the screwdriver 1 serves to drive Phillips screws. The working end 4, which is developed in cross shape in cross section, is formed by four ribs 12 arranged an equal angle apart and slots or fillets 11 the walls of which form working surfaces 5 by which the screwdriver or its working end 4 acts on the cross-slot head of a Phillips screw.

In order to obtain corrosion protection of the working end 4 and optimal transmission of torque, the working end 4 has a multi-layer coating 6. Directly on the working surfaces 5, there is an electroplated base layer 7. It consists of nickel or of a metal of the 1st to 8th groups and has a thickness x of about 5 μm. The thickness of the base layer 7 can furthermore be between 1 and 100 μm. The base layer serves for the application of diamond chips forming particles of friction material 8, which particles 8 are applied to the working surfaces 5 with an embedment layer which is then also applied by electroplating. Nickel is also selected for the embedment layer 9. The embedment layer 9 fills the spaces between the individual particles of friction material located alongside of each other over a part of their height. The level of this embedment layer is slightly raised in the region of the particles 8 of friction material, which further improves the anchoring of said particles.

It can be noted from FIG. 3 that the thickness x of the base layer 7 is less than the thickness y of the embedment layer 9. The thickness y corresponds approximately to twice the thickness x. It can furthermore be noted from FIG. 3 that the particle size of the particles 8 of friction material which rest directly on the base layer 7 is greater than the thickness y. In this way, sections 10 protruding beyond the embedment layer 9 are produced. In the embodiment shown, the particle size is about 50 μm. However, depending on the purpose of use, a particle size of between 3 and 500 μm can be selected. However, it must always be seen to it that the particle size is greater than the thickness y of the embedment layer 9.

Upon the electrolytic application of the embedment layer 9 in which the particles 8 of friction material are partially embedded, a mono-particulate layer of friction particles 8 considered statistically is obtained over partial regions, aside from the regions of the base of the valleys. The layer-by-layer application is effected in the electroplating bath with about 75 milliamperes in three sections of a bath vessel separated by diaphragm walls.

Upon the commencement of the transmission of torque, the working surfaces initially rest linearly against the drive surfaces of the screw. As the torque becomes greater, due, for instance, to further screwing in of the screw or in the tightening phase thereof, the linear support passes into an area support, the protruding sections 10 of the particles of friction material 8 digging into the material of the slot wall of the screw and thus leading to a favorable force per unit of area. In this way, high torques can be transmitted without the working end of the screwdriver 1 jumping out of the crosswise slot of the screw. Since, at the same time, the particles of friction material 8 rest against the base layer 7, this contributes to overall optimal transmission of torque. As a result of the embedment layer 9 which fills the spaces between the individual adjacent particles of friction material 8, and extends over a part of the height of the particles of friction material, the latter in their turn are also firmly anchored.

As a result of the covering 6, which consists of the base layer 7, the particles of friction material 8 and the embedment layer 9, it is necessary to develop the working end 4 in a correspondingly smaller size (about 3/100 mm) so that after the covering, the working end still lies in the perpendicular. Although a reduction in stability naturally results from the undersize, this is compensated for by the covering 6.

If the "cam-out effect" is dispensed with, then a metallic covering alone can serve as corrosion layer. This is then formed of the nickel layer (base layer 7) of a thickness x of about 15 μm. The nickel layer 7 is also applied by electroplating to the working surfaces 5 of the working end 4 of the screwdriver. In principle, it is to be noted in this connection that such an application does not lead to hydrogen embrittlement, which, of course, would reduce the life of a screwdriver.

Figure 5:
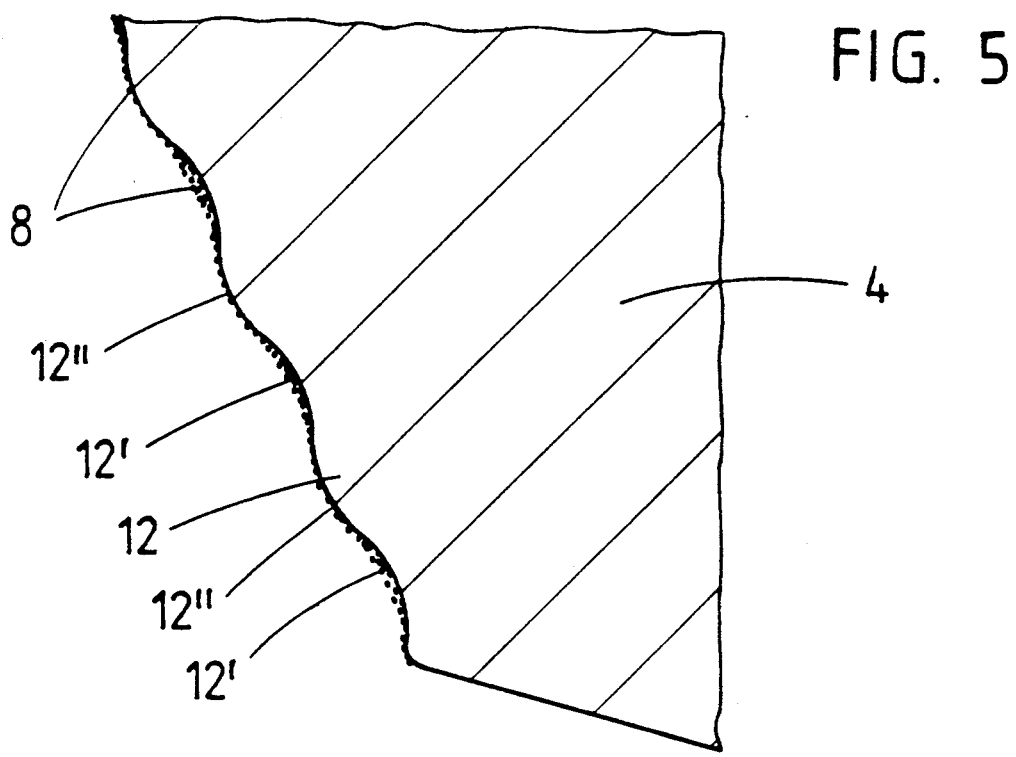
FIG. 5 is a partial longitudinal section through the working end in the region of a rib formed by slots.

A variation of the application of particles of friction material to the differently directed and structured surfaces can be noted from FIGS. 4 and 5. FIG. 4 shows, in particular, that an accumulation of friction particles 8 occurs on the approximately radially directed working surfaces 5 in the course of the fillet, this accumulation decreasing in the direction towards the circumferential surface of the rib.

If the working point of the bit is produced by deforming a lathe blank with end tapering in the form of a conical frustum, then the ribs 12, after the shaping, have—viewed under the microscope—an approximately undulated shape formed by the machining furrows. Here, the accumulation of particles of friction material 8 in the valleys 12' is greater than at the peaks 12". This leads to a particularly stable seat of the working end 4 in the crosswise slot of a screw and considerably opposes the jumping of the working end 4 out of the crosswise slot.

In the embodiment indicated by way of example, it is shown that the working surfaces of a screwdriver for Phillips screws are treated in corresponding manner. It is possible to develop the working surfaces of screwdriver bits in the same way, regardless of their shape. It would furthermore be possible to treat the working surfaces of Allan keys, ring wrenches, open-jaw wrenches, etc. in the same way.

I claim:

1. A tool with working surfaces which transmit torque by their application against a workpiece and are provided with particles of friction material comprising metallic or mineral material, such as quartz and/or diamond chips, fastened by metallic embedment, comprising an electroplated embedment layer of particles of friction material;

an electroplated metallic base layer disposed between the embedment layer and a surface of the tool for the surface application of the particles of friction material, the base layer separating the particles from the tool surface;

wherein the thickness of the base layer is less than the thickness of the embedment layer, and the thickness of the embedment layer is less than the particle size of the particles of friction material.

2. A tool according to claim 1, wherein the base layer and the embedment layer comprise nickel or a metal of the 1st to 8th groups.

3. A tool according to claim 1, wherein the base layer has a thickness between 1 and 100 μm and the particle size is between 3 and 500 μm.

4. A tool having working surfaces which transmit torque by application against a workpiece, which surfaces are covered with particles of friction material comprising metallic or mineral material, such as quartz and/or diamond chips, fastened by metallic embedment with the particles of friction material impressed into the working surfaces, the working surfaces comprising a plurality of layers and the tool serving as a substrate for supporting the layers, wherein the plurality of layers comprises a base layer of metallic material disposed on said substrate; and an embedment of metallic material disposed on said base layer with said particles being located within said embedment layer and extending outward of said embedment layer away from said base layer, said base layer separating said particles from said substrate.

5. A method for the manufacture of a tool having working surfaces which transmit torque by application against a workpiece, which surfaces are covered with particles of friction material comprising metallic or mineral material fastened by metallic embedment with the particles of friction material impressed into the working surfaces, the working surfaces comprising a plurality of layers and the toll serving as a substrate for supporting the layers, wherein the plurality of layers comprises a base layer of metallic material disposed on said substrate; and an embedment layer of a metallic material disposed on said base layer with said particles being located within said embedment layer and extending outward of said embedment layer away from said base layer, said base layer separating said particles from said substrate;

wherein the method comprises the steps of:

electroplating material of said metallic base layer onto said substrate to form said base layer;

electroplating material of said embedment layer onto said base layer to secure said particles in said embedment layer;

wherein the particle size of said particles of friction material is greater than the thickness of the base layer, and said embedment layer fills spaced between individual particles of said friction material lying next to each other over a part of their height.

* * * * *